United States Patent [19]

Pietrzykoski et al.

[11] Patent Number: 5,812,506
[45] Date of Patent: Sep. 22, 1998

[54] SYSTEM AND METHODS FOR MEASURING AND CORRECTING FOR OVERSHOOT IN A HIGH FREQUENCY (HF) SIGNAL GENERATED BY A COMPACT DISC PLAYER DURING TESTING OF A COMPACT DISC

[75] Inventors: Anthony E. Pietrzykoski, Plains; Floyd L. Goss, Jr., Lake Ariel; Charles Mecca, Jessup, all of Pa.

[73] Assignee: WEA Manufacturing, Inc., Olyphant, Pa.

[21] Appl. No.: 963,513

[22] Filed: Nov. 3, 1997

Related U.S. Application Data

[63] Continuation of Ser. No. 724,227, Oct. 2, 1996, abandoned, which is a continuation of Ser. No. 271,789, Jul. 7, 1994, abandoned, which is a continuation-in-part of Ser. No. 867,123, Apr. 10, 1992, abandoned.

[51] Int. Cl.$^6$ ........................................................ G11B 7/00
[52] U.S. Cl. .................................................. 369/54; 369/58
[58] Field of Search .................................... 369/43, 44.25, 369/44.26, 44.27, 44.29, 44.34, 44.35, 47–48, 50, 53, 54, 58, 116; 360/6, 25, 31, 53, 73.03, 77.02, 77.04; 324/73.1, 158.1, 210–212, 226–227; 356/237

[56] References Cited

U.S. PATENT DOCUMENTS

| | | | |
|---|---|---|---|
| 4,334,276 | 6/1982 | Turnbull ...................................... | 369/58 |
| 4,406,002 | 9/1983 | Wine .......................................... | 369/58 |
| 4,445,144 | 4/1984 | Giddings .............................. | 369/44.28 |
| 4,482,987 | 11/1984 | Okada et al. . | |
| 4,519,058 | 5/1985 | Tsurushimo et al. ...................... | 369/53 |
| 4,571,716 | 2/1986 | Szerlip ....................................... | 369/54 |
| 4,577,319 | 3/1986 | Takeuchi et al. . | |
| 4,646,303 | 2/1987 | Narusawa et al. . | |
| 4,665,513 | 5/1987 | Wengler .................................... | 369/54 |
| 4,697,258 | 9/1987 | Overath et al. . | |

(List continued on next page.)

FOREIGN PATENT DOCUMENTS

| | | |
|---|---|---|
| 0144831 | 6/1985 | European Pat. Off. . |
| 0309639 | 4/1989 | European Pat. Off. . |
| 0397126 | 11/1990 | European Pat. Off. . |

OTHER PUBLICATIONS

Philips International Report No. AR–17–AP–253, "Signal Amplitude Measurements" (Oct. 14, 1986).

"Proposed Standard For Controlling the Quality of CD–ROM Discs (DRAFT)," Commissioned by The Information Handling Committee, Director of Central Intelligence, Intelligence Community Staff, Washington, DC 20505, Version 1.1 (Oct. 1991).

Ken C. Pohlmann, "The Compact Disc," (1989) pp. 244–251.

Patent Abstracts of Japan, vol. 15, No. 435 (P–1272) (Nov. 6, 1991) & JP3–181033.

Patent Abstracts of Japan, vol. 15, No. 460 (P–1278) (Nov. 21, 1991) & JP3–194778.

*Primary Examiner*—W. R. Young
*Attorney, Agent, or Firm*—Fish & Neave

[57] ABSTRACT

A system for testing compact discs having audio or video information and time subcode information indicating the elapsed time from the beginning of the audio, video or data information thereon in which three microprocessors respectively monitor the HF signal, the radial tracking signal and the decoder digital flags produced by a CD player to produce error signals indicating HF dropout, HF low, modulation amplitude, radial tracking, Burst, Bler, and uncorrectable errors and in which a computer having a memory responds to the time signal produced by the player periodically to transfer the contents of the microprocessors to the memory together with the time of transfer and to reset the microprocessors, thus to record errors and to locate the positions thereof on the disc in terms of the time subcode information. Initially an eccentricity test is performed and the entire test is stopped if the eccentricity is excessive. The computer is programmed to display the test results in various formats.

16 Claims, 13 Drawing Sheets

U.S. PATENT DOCUMENTS

| | | | |
|---|---|---|---|
| 4,719,612 | 1/1988 | Kenjyo | 369/54 |
| 4,821,251 | 4/1989 | Hosoya . | |
| 4,821,254 | 4/1989 | Satoh et al. | 369/54 |
| 4,888,549 | 12/1989 | Wilson et al. | 360/31 |
| 4,889,979 | 12/1989 | Drexler et al. | 235/454 |
| 4,926,408 | 5/1990 | Murakami et al. | 369/58 |
| 4,935,811 | 6/1990 | Tsuchihashi et al. . | |
| 4,941,138 | 7/1990 | Chida et al. | 369/44.41 |
| 4,949,036 | 8/1990 | Benzinque et al. | 360/31 |
| 4,980,878 | 12/1990 | Szerlip | 369/54 |
| 4,991,162 | 2/1991 | Tabe | 369/58 |
| 4,996,679 | 2/1991 | Yoshio | 369/33 |
| 5,009,818 | 4/1991 | Arai et al. . | |
| 5,023,857 | 6/1991 | Verboom | 369/44.32 |
| 5,121,370 | 6/1992 | Yanagi | 369/44.29 |
| 5,212,677 | 5/1993 | Shimote et al. | 369/58 |
| 5,233,584 | 8/1993 | Kulakowski et al. | 369/44.29 |
| 5,260,923 | 11/1993 | Baba | 369/44.32 |
| 5,325,351 | 6/1994 | Uchiyama et al. | 369/275.1 |

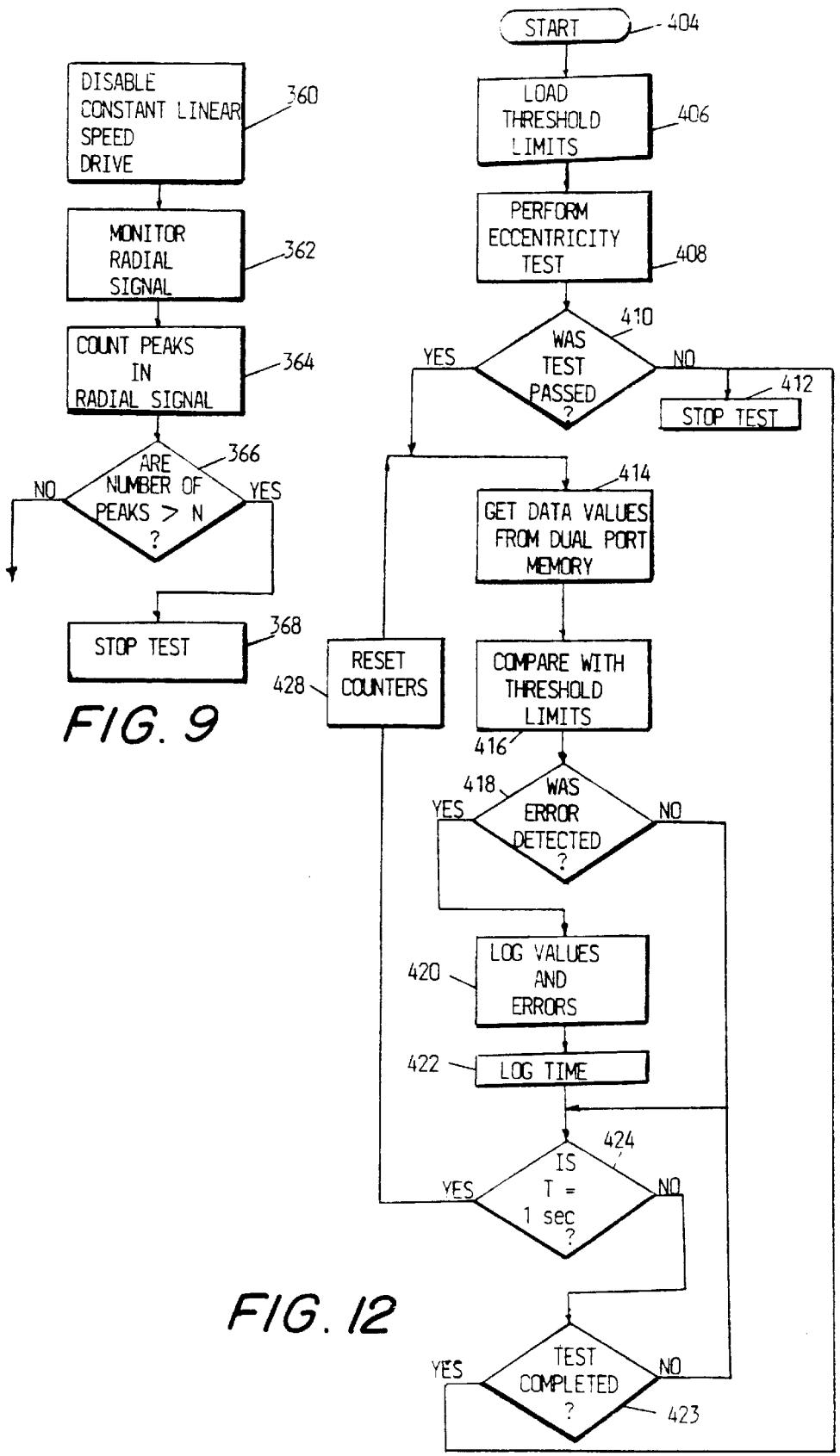

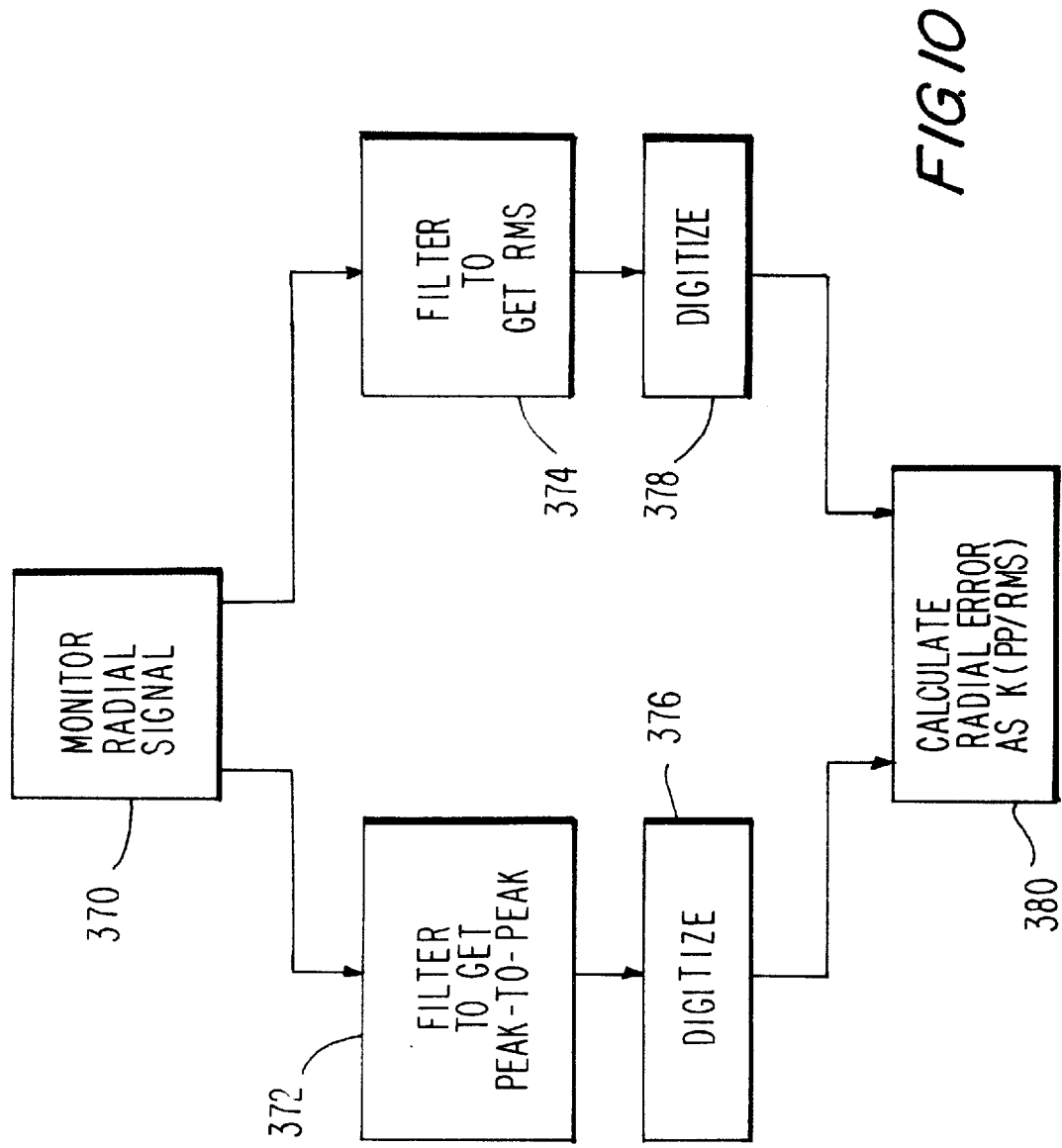

SYSTEM AND METHODS FOR MEASURING AND CORRECTING FOR OVERSHOOT IN A HIGH FREQUENCY (HF) SIGNAL GENERATED BY A COMPACT DISC PLAYER DURING TESTING OF A COMPACT DISC

This is a continuation, of application Ser. No. 08/724,227, filed Oct. 2, 1996, entitled COMPACT DISC ANALYZER SYSTEM FOR PROVIDING A RECORD OF ERRORS AND THE TIME OF OCCURRENCE THEREOF, now abandoned, which is a continuation of application Ser. No. 08/271,789, filed Jul. 7, 1994, now abandoned, which is a continuation-in-part of application Ser. No. 07/867,123, filed Apr. 10, 1992, now abandoned.

FIELD OF THE INVENTION

The invention is in the field of electrical test devices and more particularly relates to a compact disc analyzer system which overcomes the defects of testers of the prior art.

BACKGROUND OF THE INVENTION

As is known in the art, compact discs (CDs) must meet relatively stringent mechanical and electrical requirements. Further as is known in the art, a CD player reads a CD by means of a laser beam which is caused by a servo system to follow the spiral track of information recorded on the disc. In the course of this operation, a radial error signal is generated. Further, the player produces a high frequency output signal representing the information contained in the pits on the track. This information comprises the recorded selections and coded information including time information from the beginning of the recorded information throughout the recorded information. The player has a first decoder which is designed to correct random errors. A second decoder is able to correct random errors which the first decoder was unable to correct. These decoder flag errors are used to count various error counts.

Manufacturers of compact discs are required to meet certain requirements set by the licensee who has the right to make copies of the performance and who orders production of the disc. These specifications set limits on the number and kinds of errors in a disc. Such errors include digital errors flagged by the player decoders and high frequency signal errors as well as radial tracking error and eccentricity. It will readily be appreciated that knowledge of the locations on the CD whereat errors occurred is of prime importance.

There are known in the prior art testers for indicating errors of the type described above. Such testers indicate the times of occurrence of errors as times generated by means of computers which form part of the test equipment but which are independent of the operation of the disc player and of the disc under test. They do not account for such factors as the time it takes for a particular player to come up to speed. It will readily be appreciated that this factor may vary from player to player. Neither do testers of the prior art account for the orientation of the disc as it is placed on the player. Obviously the orientation may vary from test to test. These factors assume great importance in compact discs in which so much information is packed into such a small space.

As a result of the foregoing, testers of the prior art do not afford as accurate indications of the location of errors as is desirable. Consequently, the test results are not consistent from test to test. That is to say, the same disc can be tested a number of times with different results obtained each time. The test results are not repeatable.

SUMMARY OF THE INVENTION

One object of our invention is to provide a compact disc tester which overcomes the defects of testers of the prior art.

Another object of our invention is to provide a compact disc tester which is reliable.

A further object of our invention is to provide a compact disc tester which is certain in operation.

Still another object of our invention is to provide a compact disc tester which produces substantially the same result for a plurality of tests of the same disc.

Yet another object of our invention is to provide a compact disc tester which records errors and the location of the errors.

Other and further objects of our invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views:

FIG. 9 is a diagrammatic view illustrating the steps performed in the course of making the eccentricity test in our system.

FIG. 10 is a diagrammatic view illustrating the steps performed in the course of determining the radial error in our system.

FIG. 12 is a diagrammatic view illustrating the steps performed in carrying out a compact disc test in our system.

DESCRIPTION OF THE PREFERRED EMBODIMENT

Figure 1:
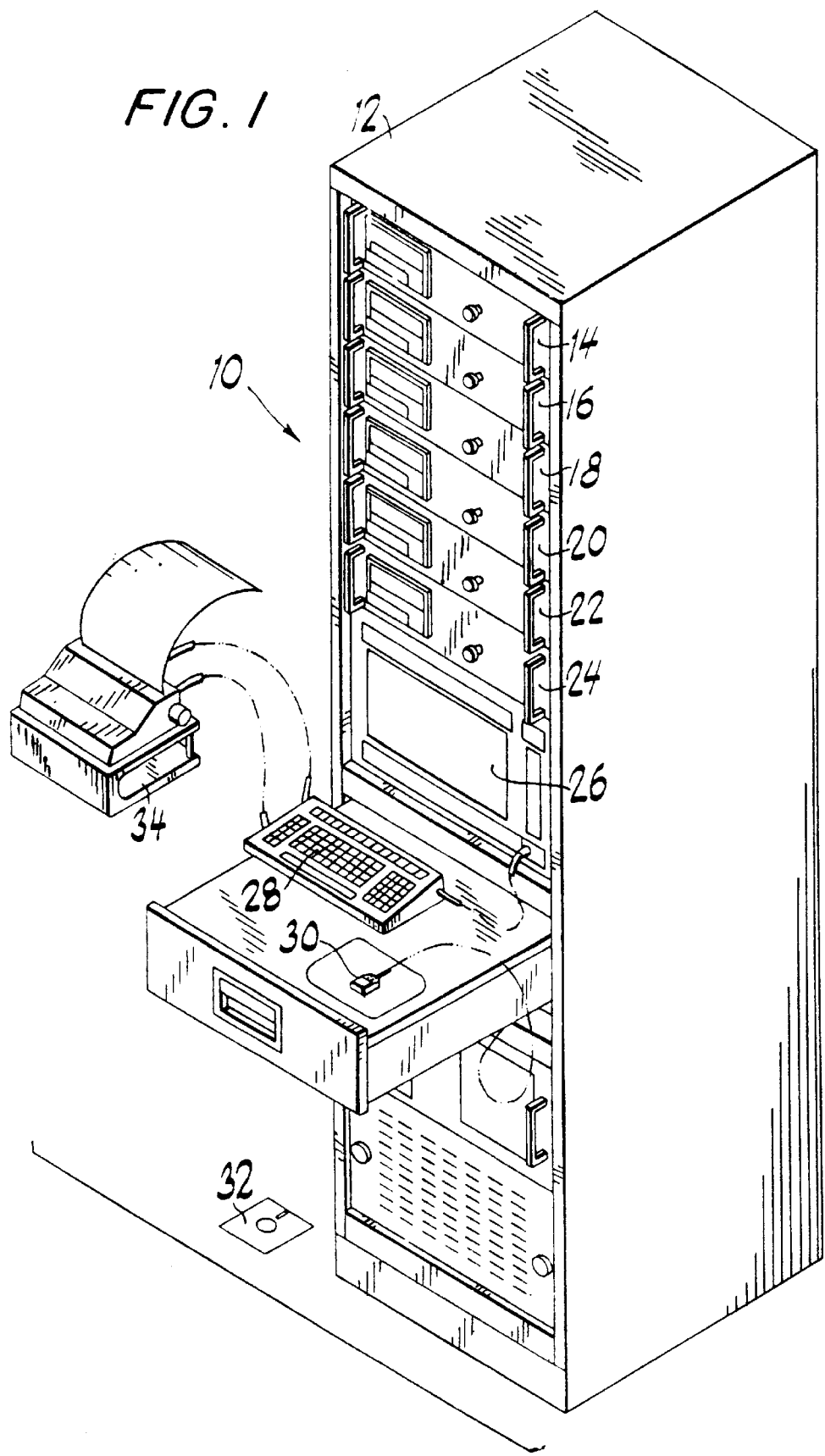
FIG. 1 is a perspective view of our multi-unit compact disc analyzer system illustrating the major components thereof.

Referring now to FIG. 1 of the drawings, our CD analyzer system indicated generally by the reference character 10 includes a cabinet 12 adapted to house up to six drawers, 14, 16, 18, 20, 22 and 24, each of which holds a CD player to be described more fully hereinbelow. As will be explained further, our system may be operated in such a manner as to perform the required test or tests using only a single player or as many as six players to expedite the test.

Our system includes a main computer provided with a display screen 26. A keyboard 28 having 101 keys is associated with the main computer. The system includes a two button mouse 30 and a disc 32 encoding the software to be described more fully hereinbelow, as well as a printer 34 of any suitable type known to the art.

Figure 2:
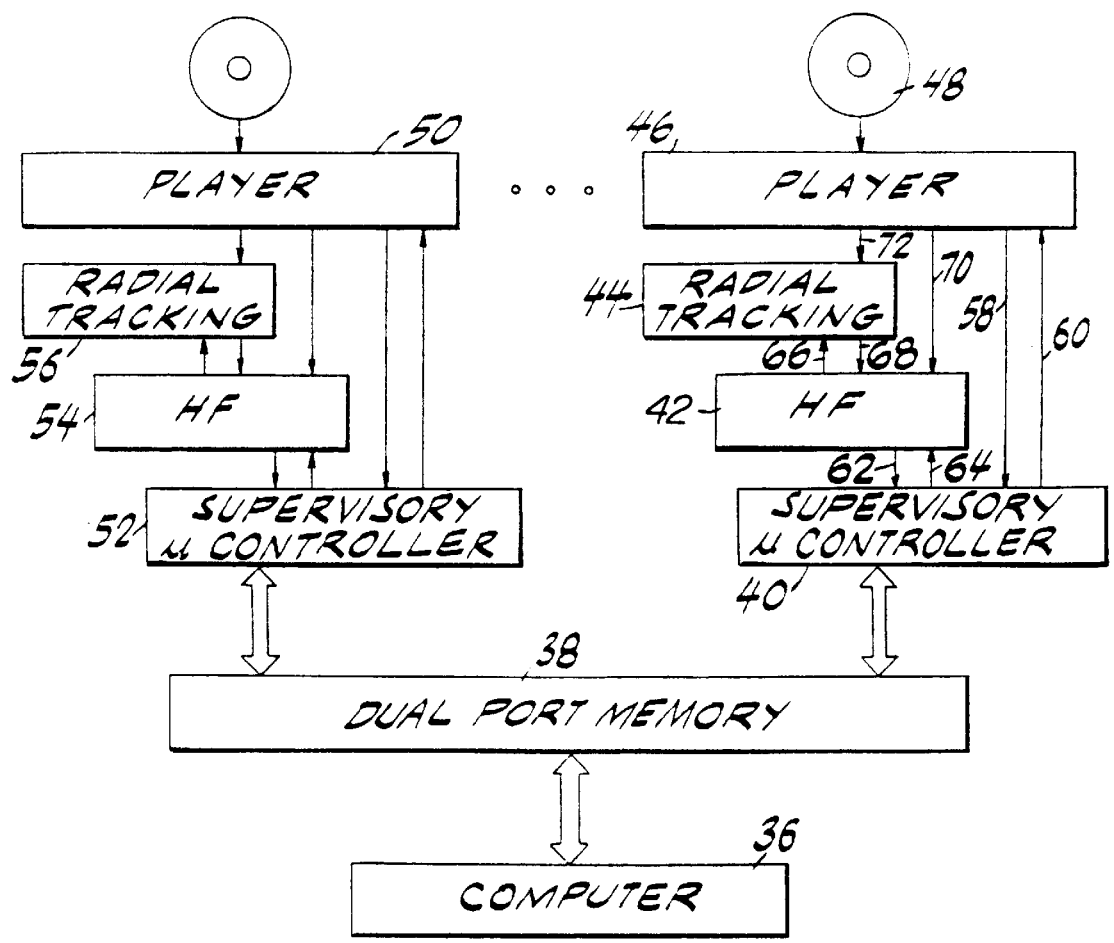
FIG. 2 is a block diagram of our CD analyzer system.

Referring now to FIG. 2, the basic CD analyzer includes a main user interface/analysis computer 36, a dual port memory 38, six supervising microcontrollers 40, signal acquisition microcontrollers including a high frequency board 42 and a radial tracking board 44 and a compact disc player 46 adapted to play a disc 48.

It is to be understood that we may use either a single player 46 or a plurality of players housed in the drawers 14, 16, 18, 20, 22 and 24. For purposes of simplicity in FIG. 2, we have illustrated only the first player 46 and the last player 50 where a multiplicity of players are used. It is to be understood that individual microcontrollers 40, high frequency boards 42, and radial tracking boards 44 are provided for the individual players with the dual port memory 38 and the computer 36 being shared among the plurality of boards. For example, a supervising microcontroller 52, a high frequency board 54 and a radial tracking board 56, may be associated with the last player 50.

The computer 36 monitors and analyzes information from the microcontrollers 40 and 52. Through the operator it controls the testing of the compact disc. As is known in the art, it can display the results on screen 26 or print the test results on the printer 34.

As will be explained more fully hereinbelow, each of the supervising microcontrollers, such as the controller 40, takes error information from the error decoders of the associated player 48 through a channel 58 and sends suitable signals to the player through a channel 60.

The supervising controller, such as controller 40, communicates with the HF board 42 through channels 62 and 64 and with the radial tracking board 44 by means of the HF board through channels 66 and 68. Board 42 receives information from the player 46 through a channel 70. Board 44 receives its information from the player 46 through the channel 72.

The dual port memory 38 provides memory which is shared between the supervising microcontrollers 40 and 52 and the like and the computer 36. It transfers commands and information. It is divided into partitions, with each partition being assigned to one supervising microcontroller.

Figure 3:
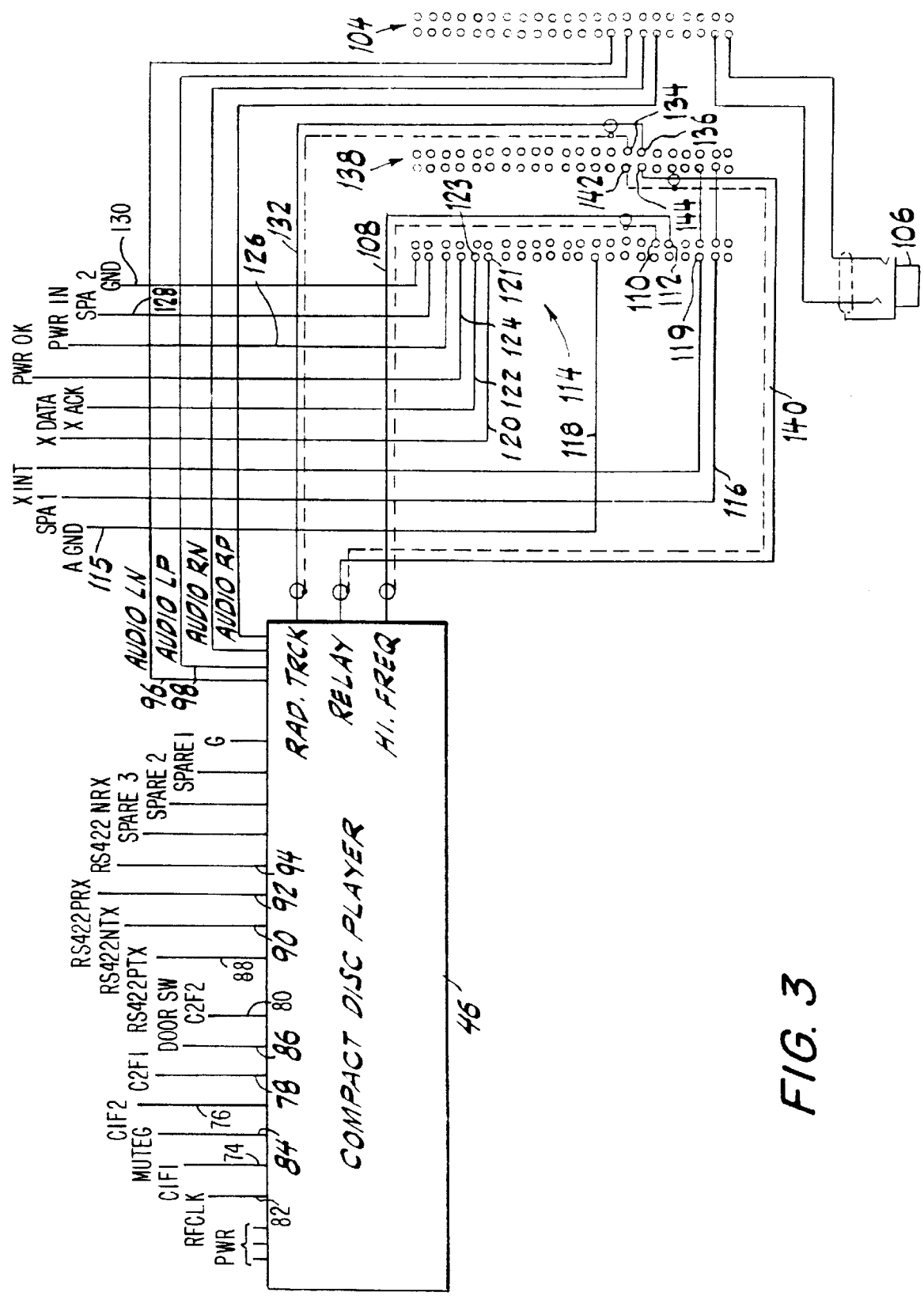
FIG. 3 is a schematic diagram of one of the compact disc player components of our CD analyzer system.

Referring now to FIG. 3, each of the compact disc players, such for example as the player 46, may be of any suitable type known to the art, such for example as a Sony model 3000 player. Connections are made to the player in order to extract the desired readily available information. For example, conductors 74, 76, 78 and 80 may carry the error flags ClF1, ClF2, C2F1 and C2F2 from the error decoders of the compact disc player. Conductors 82, 84 and 86 carry RFCLK, MUTEG, and DOOR-SW information. Conductors 88, 90, 92 and 94 respectively carry RX422PTX, RS422NTX, RS422PRX and RS422NRX subcode signals. The audio left signal is on conductors 96 and 98, while the audio right signal is on conductors 100 and 102. These conductors may be connected to a suitable cable terminal indicated generally by the reference character 104 to which an earphone 106 may be connected to permit the operator to monitor the player.

We extract high frequency information from the player 46 by means of a cable 108 which is connected to elements 110 and 112 of a cable receptacle indicated generally by the reference character 114. It will also be seen that we connect lines 115, 116, 118, 120, 122, 124, 126, 128 and 130 carrying signals AGND, SPA1, XINT, XDATA, XACK, PWR OK, PWR IN, SPA2 and GND to elements of the receptacle 114. Radial tracking information from the player 46 is carried by a cable 132 to elements 134 and 136 of a cable receptacle indicated generally by the reference character 138. A coaxial connector 140 connects elements 142 and 144 of receptacle 138 to a RELAY input of the player 46 to disable the disc constant linear speed feedback loop during the eccentricity test.

Figure 4:
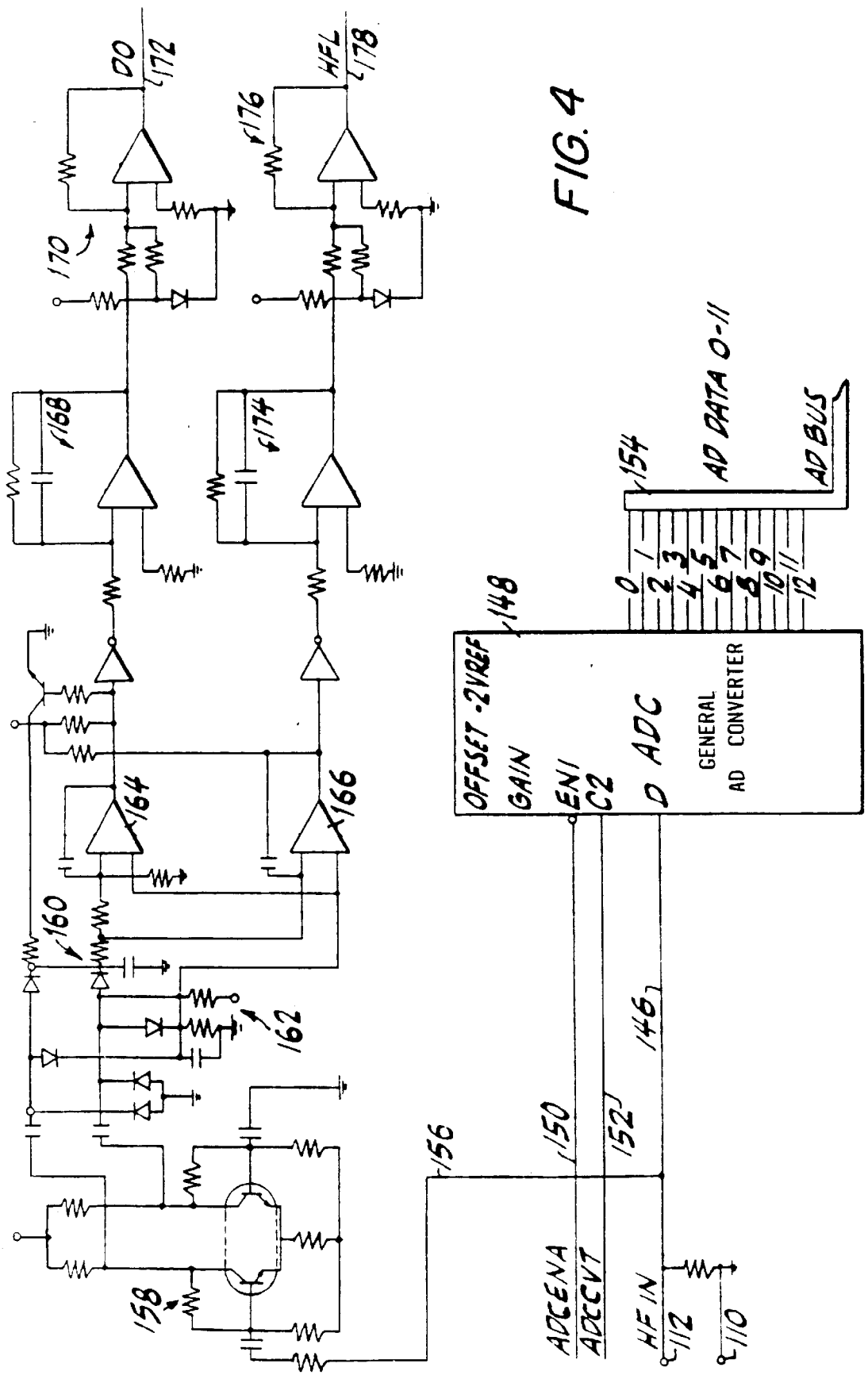
FIG. 4 is a schematic diagram of a first portion of the high frequency module of our CD analyzer system.

Referring now to FIG. 4, in each of the high frequency chips, such as the chip 42 of our system, a conductor 146 applies the HF signal appearing on elements 110 and 112 of receptacle 114 to an analog to digital converter 148 which, in response to suitable signals, analog-to-digital enable AD ENA and analog-to-digital convert AD CVT on lines 150 and 152, converts the HF signal to a digital output appearing on a bus 154 as AD DATA, 0–11. The general A/D converter 148 may be of any suitable type known to the art.

A conductor 156 applies the signal on line 146 to a differential amplifier indicated generally by the reference character 158. The amplifier 158 converts the high frequency signal into a quasi AC so that rectifiers indicated generally by the reference characters 160 and 162 can handle the signal. The rectified outputs produced by the rectifiers 160 and 162 are applied to the inputs of comparators 164 and 166 which compare the rectified outputs with reference values or threshold limits to obtain outputs which are measures respectively of high frequency dropout error and high frequency low error.

Figure 5A:
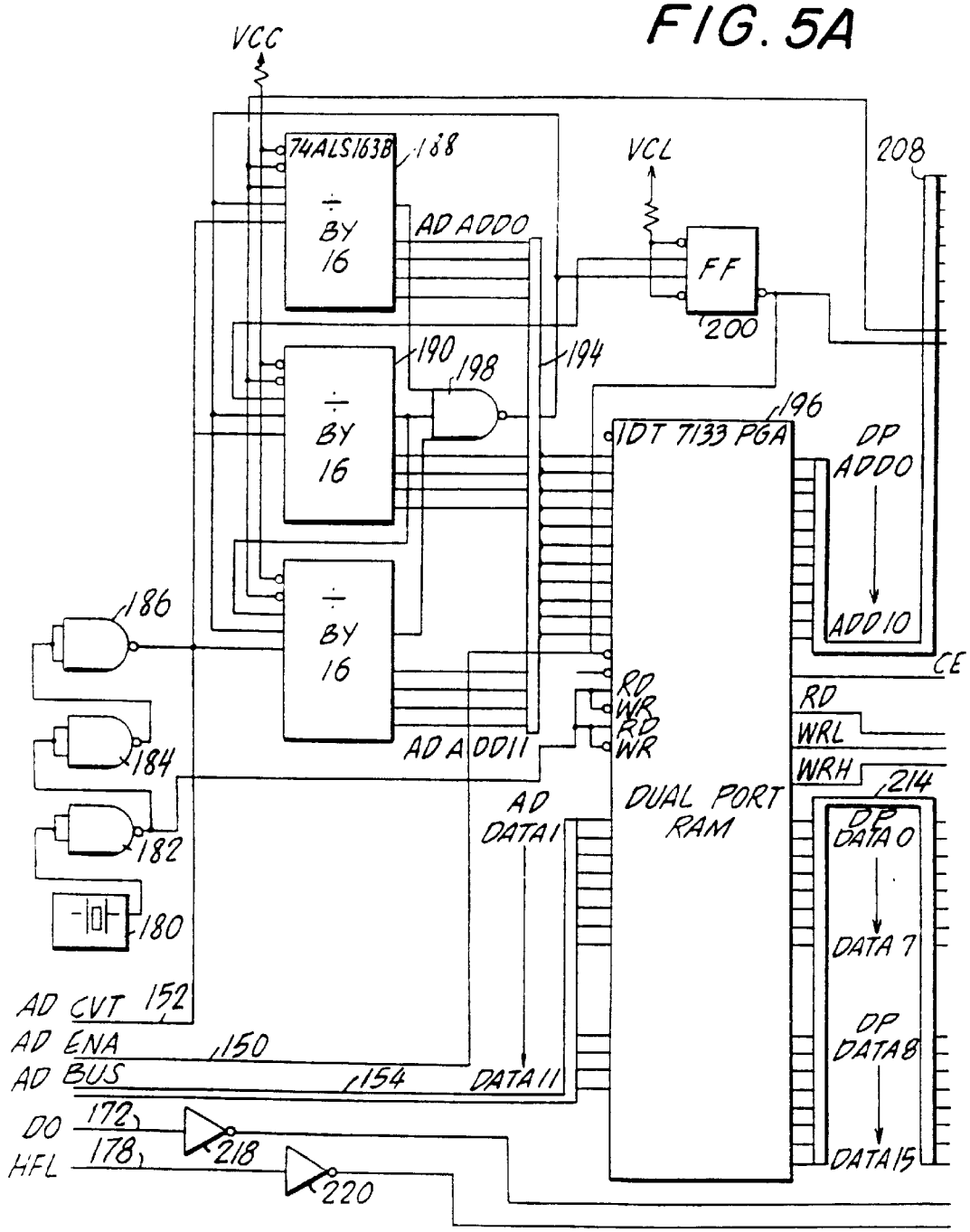
FIG. 5A is a schematic diagram of a further portion of the high frequency module of our CD analyzer system.
Figure 5B:
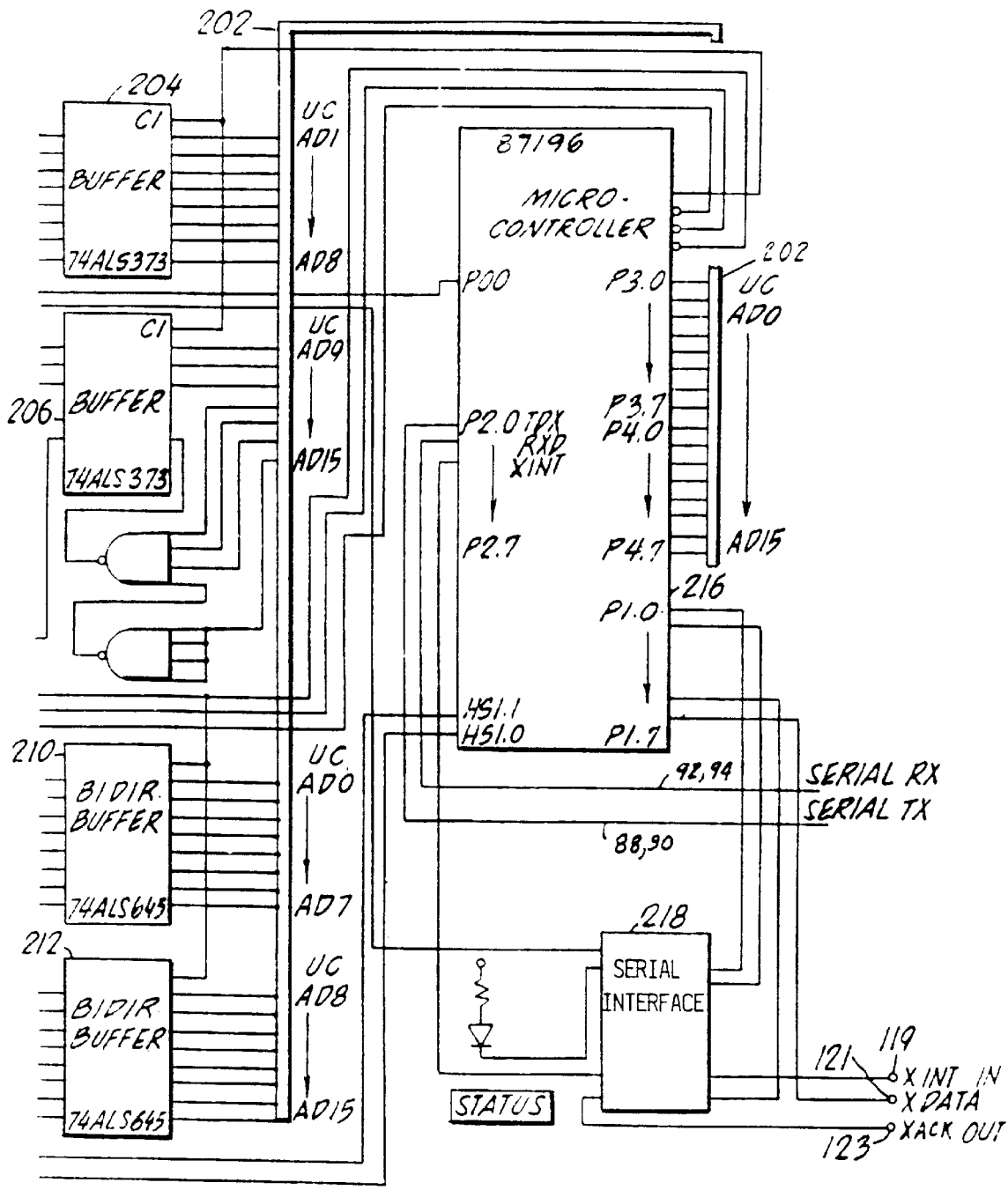
FIG. 5B is a schematic diagram of the remaining portion of the high frequency module of our CD analyzer system.

A first pair of filtering circuits 168 and 170 remove the noise from the output of comparator 164 to provide a high frequency dropout (DO) error signal on a conductor 172. A second pair of filtering circuits 174 and 176 remove the noise from the output of comparator 166 to provide a high frequency low (HFL) error signal on a conductor 178. Referring now to FIGS. 5A and 5B, crystal oscillator source 180 and three NAND circuits 182, 184 and 186 provide an input to each one of three DIVIDE BY 16 circuits 188, 190 and 192. These dividers may for example be 74ALS163B. Circuit 188 provides bits AD ADDØ–3 to a bus 194. Similarly the circuits 190 and 192 apply groups of bits AD ADD3–7 and AD ADD8–11 to the bus 194 which is connected to the left hand ports of a dual port RAM 196 which may be a 1 DT 71 33 PGA, for example.

A three input NAND circuit 198 responsive to inputs from circuits 189, 190 and 192 provides an input for a flip-flop 200 which generates the chip select for the memory 196. Conductor 152 carrying the CVT signal is connected to the output of the NAND circuit 186. Conductor 150 carrying the ENA signal is connected to the RAM 196. Bus 154 carrying the AD DATA1–11 bits is connected to the left lower ports of RAM 196.

A bus 202 leading from the supervisory microprocessor to be described hereinbelow, carries bits UC AD0–15. Respective bidirectional buffers 204 and 206 transfer groups of bits UC AD1–8 and UC AD9–15 to a bus 208 coupling DP ADD0–10 to the upper right-hand ports of the RAM 196. A second pair of bidirectional buffers 210 and 212 couple UC ADØ–7 and UC AD8–15 to a bus 214 which couples DP DATAØ–7 and DP DATA8–15 to the lower right group of ports of the RAM 196.

Bus 202 also couples UC AD§–15 to the groups of ports P3.0-7 and P4.0-7 of a microcontroller 216 which may for example be an 87196. Respective inverters 218 and 220 couple conductors 172 and 178 carrying DO and HFL to the HS1.1 and HS1.0 ports of microcontroller 216. We connect the element 119 of receptacle 114 carrying the XINT signal to a bidirectional buffer 218 which couples the signal to the microcontroller 216. The terminal of the buffer 218 carrying the XACK OUT signal is connected to the element 123 of receptacle 114. The receptacle element 121 carrying the XDATA signal is connected to the P1.7 port of microcontroller 216, the P1.6 port of which is connected to the buffer 218. A conductor 221 connects the P0.0 port of controller 216 to the dividers 188, 190 and 192.

Respective conductors 222 and 224 carrying the SERIAL RX and SERIAL TX signals are applied to the P2.0 and P2.1 ports of controller 216.

Figure 6:
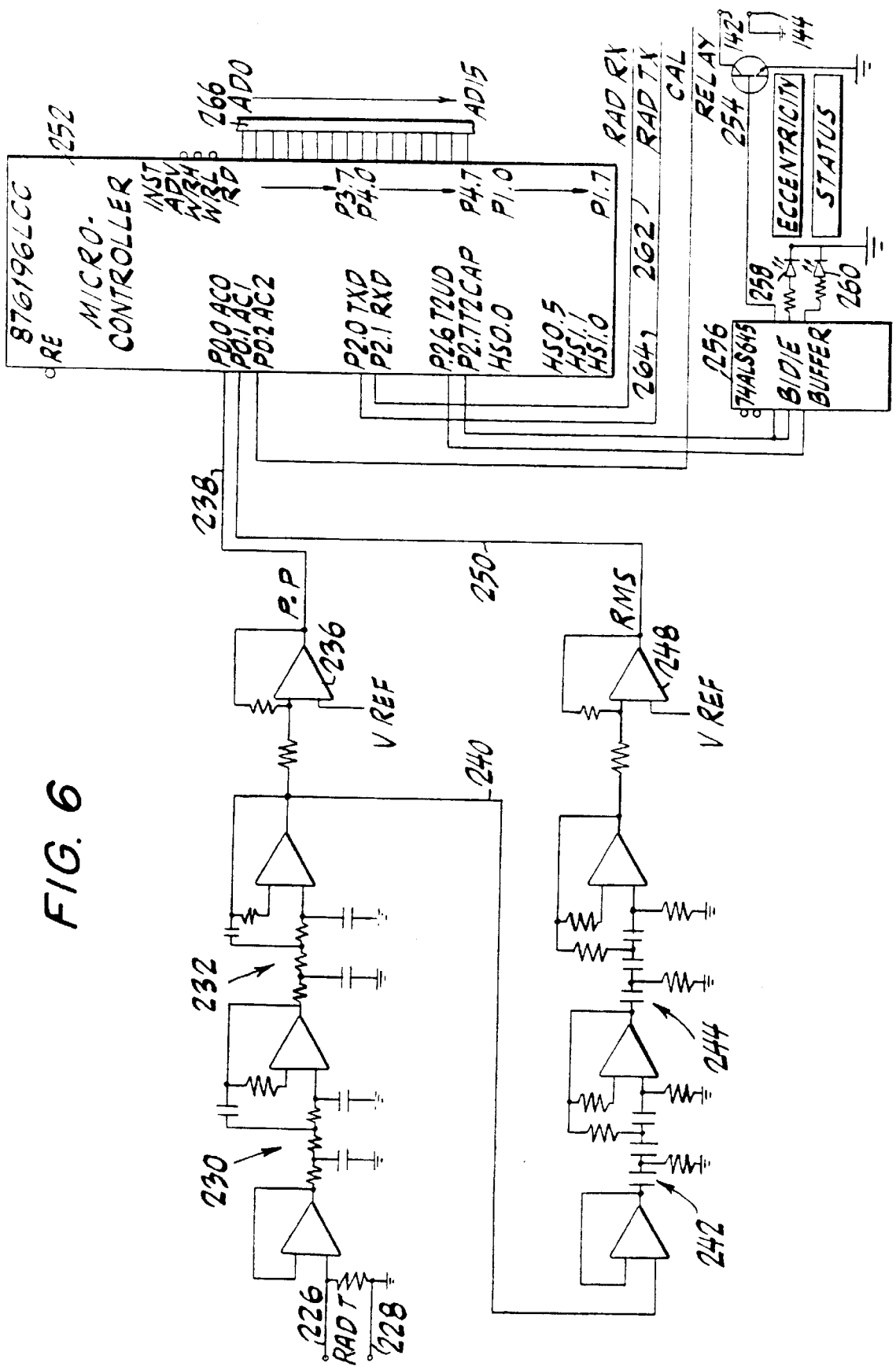
FIG. 6 is a schematic diagram of the radial tracking module of our CD analyzer system.

Referring now to FIG. 6, which shows one of the radial tracking chips such as the chip 44 of the circuitry, conductors 226 and 228 connect the elements 134 and 136 of receptacle 138 carrying the radial tracking signal to two series-connected high pass filter circuits 230 and 232. A comparator 236 responsive to the output of the filter circuits provides an output on conductor 238 as a measure of the peak-to-peak value of the radial tracking signal.

A conductor 240 applies the output of filter circuit 232 to the input of two series-connected low pass filter circuits 242 and 244, the output of which is applied to a comparator 248 which produces an output on line 250 which is a measure of the RMS value of the radial tracking signal. We apply the signals on conductors 238 and 250 to the P0.0 and P0.1 ports of a microcontroller 252. A transistor 254 couples the elements 142 and 144 of receptacle 138 to a bidirectional buffer 256. We couple the P2.6 and P2.7 ports of controller 252 to the buffer 256 to disable the feedback loop of the constant linear speed disc drive at the proper time and to determine the status of a pair of light emitting diodes 258 and 260 corresponding respectively to "eccentricity" and to "status". Respective conductors 262 and 264 carrying RAD RX and RAD TX are connected to the P2.0 and P2.1 ports of microcontroller 252. A bus 266 carrying AD0–15 is connected to the groups of ports P3.0-7 and P4.0-7 of the microcontroller 252.

Figure 7:
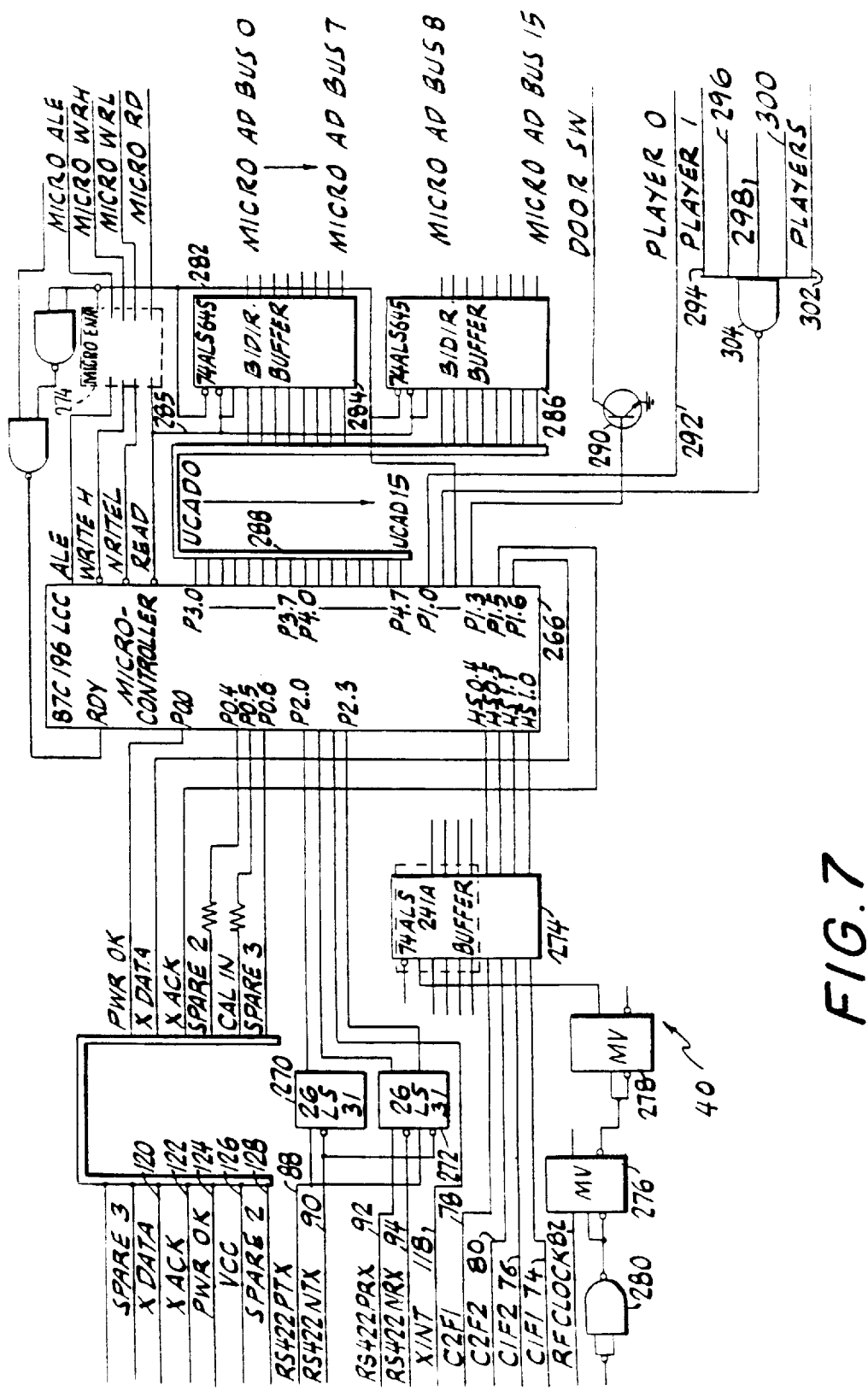
FIG. 7 is a schematic diagram of the supervisory microcontroller component of our CD analyzer system.

Referring now to FIG. 7, the supervisory microcontroller circuit such as the controller 40 associated with player 46 of our CD tester system, includes a microcontroller 266 which may for example be an 87196. A bus 268 carries the signals on lines 120, 122, 124, 126 and 128 and other possible signals to the microcontroller 266. From the bus 268 we apply the PWR OK, the SPARE 2, the CAL IN and the SPARE 3 to the P0.0 and P0.4-6 ports of the microcontroller 266. A first output level translator 270 responsive to the subcode signals RS422PTX and RS422NTX on lines 88 and 90 applies an input to the P2.0 port of controller 266. A second output level translator responsive to the subcode signals RS422PTX, RS422NTX, RS422PRX and RS422NRX on lines 88, 90, 92 and 94, applies its outputs to ports P2.1 and P2.3 of controller 266. We apply the X INT signal on line 118 to the port P2.2.

A buffer 274 is adapted to couple the signals on lines 78, 80, 76, and 74 respectively to the ports HS0.4, HS05, HS1.1 and HS1.0 of the controller 266.

A first multivibrator 276 responsive to the RFCLK signal on line 82 and to the output of a NAND circuit 280 responsive to the MUTEG signal on line 84, actuates a second multivibrator 278, the output of which is applied to buffer 274.

As indicated by the dot-dash lines in the upper right-hand corner of FIG. 7, the buffer 274 is adapted to couple the respective microcontroller "address, latch, enable", "write high", "write low" and "read" MICRO ALE, MICRO WRH, MICRO WRL and MICRO RD signals to the controller 266. A conductor 282 applies the MICRO ENA signal to buffer 274.

A pair of bidirectional buffers 284 and 286 couple MICRO AD BUS Ø–7 and MICRO AD BUS 8–15 to a bus 280 from which the groups of signals are coupled to ports P3.Ø–7 and ports P4.Ø–7 of the controller 266. Conductor 282 also applies the MICRO ENA signal to buffers 284 and 286. A conductor 285 applies the READ signal from buffer 274 to the buffers 284 and 286.

A transistor 290 couples DOOR SW on conductor 86 to the P1.3 port of controller 266. A conductor 292 applies the PLAYER 0 signal to the P1.0 port of controller 266. A five-input NAND circuit 304 couples lines 294, 296, 298, 300 and 302 carrying the respective PLAYER 1 to PLAYER 5 signals to the P1.1 port of controller 266. Conductor 282 is connected to the P1.2 port. The X DATA and X ACK signals from bus 268 are connected to the P1.5 and P1.6 ports.

Figure 8A:
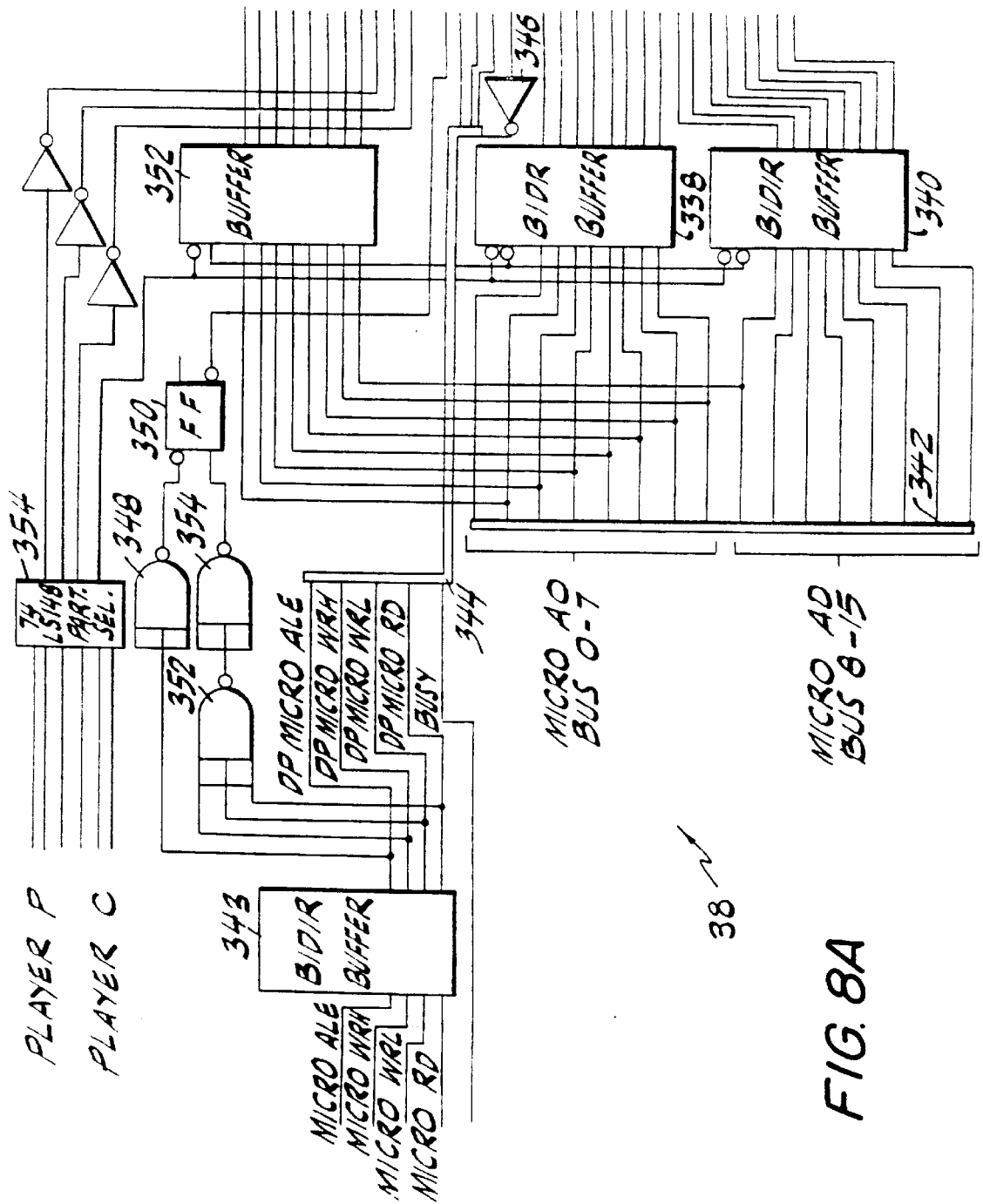
FIG. 8A is a schematic diagram of a first portion of the dual port memory of our CD analyzer system.
Figure 8B:
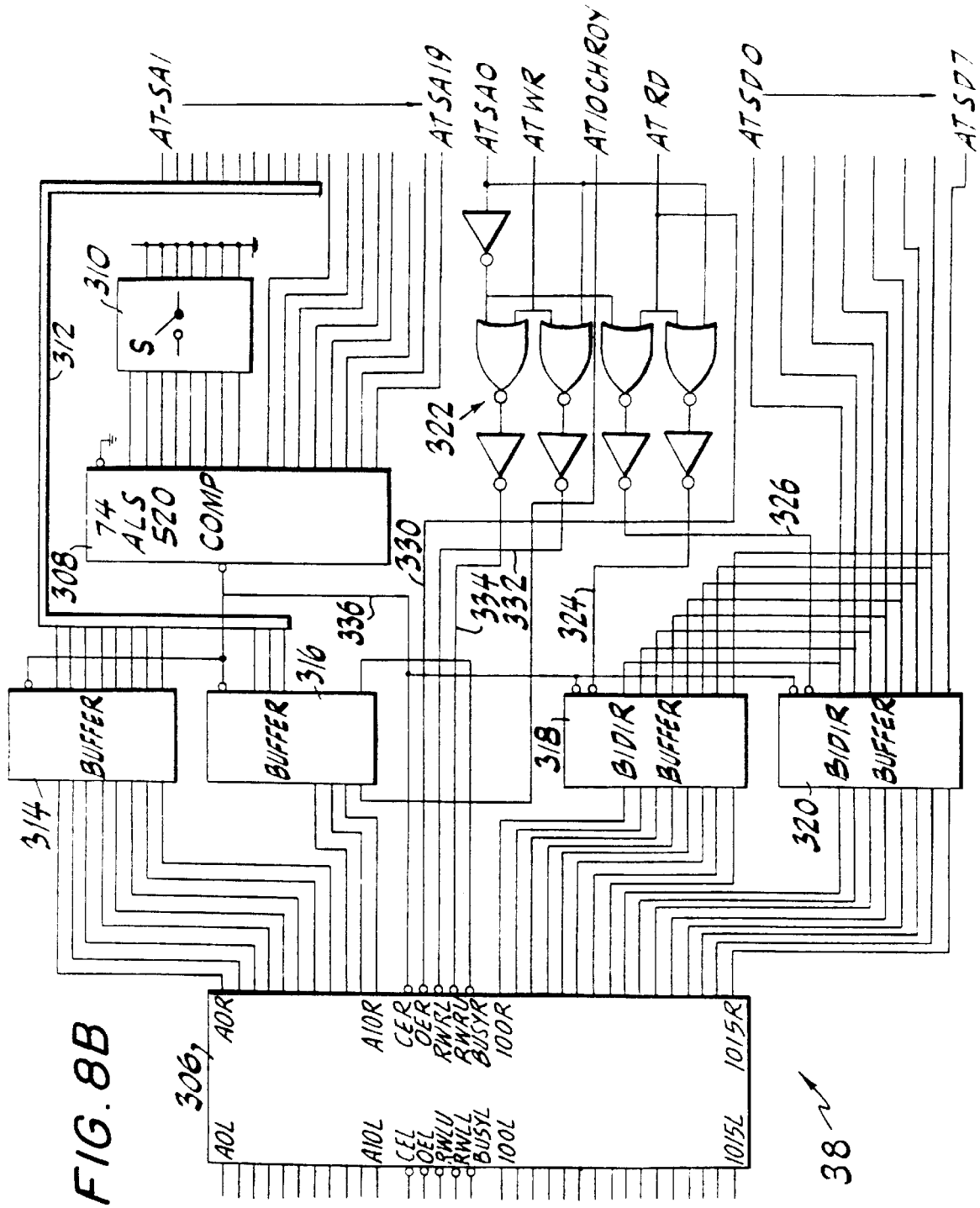
FIG. 8B is a schematic diagram of the remaining portion of the dual port memory of our CD analyzer system.

Referring now to FIGS. 8A and 8B, the common dual port memory circuit 38 of our system includes a dual port RAM 306. We apply the main computer address AT-SA 12–19 to a comparator 308. A DIP switch 310 is adapted to be set to provide the other inputs for comparator 308. As is known in the art, when the computer address signals applied to comparator 308 correspond to the signals from the DIP switch 310, comparator 308 puts out a signal indicating the correspondence.

A bus 312 couples the computer address signals AT SA1–11 to a pair of buffers 314 and 316. We apply the computer AT SD0–7 signals to a pair of bidirectional buffers 318 and 320. The outputs of buffers 314 and 316 lead to the ports A0R to A10R of memory 306. The left hand ports of buffers 318 and 320 are connected to the 100R to 1015R ports of memory 306. An array of NOR circuits and inverters indicated generally by the reference character 322 responsive to the signals SAO, WR and RD provide respective signals on lines 324 and 326 which, together with the output of the comparator 308, enable the buffers 318 and 320 to couple the lines SD0 through SD7 to the 1ØR through 1Ø15R ports of memory 306. We connect the "input-output channel ready" IO CH RDY line 328 to buffer 316.

A conductor 330 connects the RD line to the "output enable right" OER port of memory 306. The array 332 provides two other signals on lines 332 and 334 connected to the RWRL and RWRU ports of memory 306. A conductor 336 couples the output of comparator 308 to the "chip enable right" CER port. Buffer 316 provides an input for the BUSY R port.

Respective bidirectional buffers 338 and 340 are adapted to transfer signals between a bus 342 carrying the MICRO AD BUS Ø–15 and the 10L to 1Ø15L ports of the memory 306.

A bidirectional buffer 343 is adapted to couple the MICRO ALE, MICRO WRH, MICRO WRL and MICRO RD lines at the upper right-hand corner of FIG. 7 to a bus 344 to apply these signals together with a BUSY signal to the OEL, RWLU and RWLL ports of memory 306 and to an inverter 346.

A NAND circuit 348 from the ALE line provides one input for a flip-flop 350, the other input of which is provided by series connected NAND circuits 352 and 354, the first of which receives its inputs from the WRH, WRL and RD lines. Flip-flop 350 generates a chip select signal for the dual port memory which is applied to the CE OUT port of memory 306.

A third buffer 352 is adapted to couple the MICRO AD BUS 1–8 lines to the AØL to A7L ports of memory 306.

Respective PLAYER 0–5 lines from the CD players 46 through 50 are connected to a partition select circuit 354, one output of which controls the buffers 338, 340 and 352, and the other three outputs of which are fed through respective inverters to the A8L through A10L ports of memory 306. The memory 306 is a 2KX16 memory. The function of the element 354 is to divide the available memory by eight so that one-quarter K of memory is reserved for each of the players. The arrangement is such that when we want any of the players or drawers to communicate with the main computer, the corresponding line is taken low and only that player can talk to the corresponding partition of the memory.

When the microcontroller 40, compact disc player 46, and computer 36 are communicating, the controller checks the signal acquisition cards, whether there is a compact disc present and whether the door of the player is closed. It keeps the door closed during a test by keeping the compact disc player in the on-line mode. Then it reads the table of contents of the compact disc 48. The microcontroller 40 positions the compact disc player anywhere on the compact disc as determined by the operator's input and the type of test.

The supervisory micro-controller 40 communicates with the Radial and HF boards 42 and 44 to synchronize the eccentricity measurement at the start of the test and to synchronize symmetry, I3 MOD AMP, I11 MOD AMP, and radial tracking from the compact disc during the test. It reports the results to the computer 36 through the dual port memory 38.

In the course of testing a CD, the first operation which is performed is to check the disc for unacceptable eccentricity or the deviation from circularity of the pit track and the positioning of the center hole. Prior to performing this check, transistor 254 of FIG. 6 is energized to produce a signal at terminals 142 and 144 of FIG. 3 which opens a feedback loop to disable the constant linear velocity drive of the player so that the disc spins at a constant angular velocity while the pickup of the radial tracking signal is stationary. Referring to FIG. 9, this step is indicated by the block 360. Under these conditions, the radial tracking signal is high when it is in register with a track and near zero between the tracks. This radial tracking signal from elements 134 and 136 of FIG. 3 is fed to conductors 226 and 228 of the radial tracking error circuitry of FIG. 6 to monitor the signal as indicated by block 362 of FIG. 9. As indicated by block 364, we count the number of peaks per unit time or per revolution of the disc as a measure of eccentricity. The count is compared with a reference, as indicated at 366, to determine whether or not an unacceptable eccentricity exists. If so, the test is stopped at 368. If not, the testing continues. As will be explained more fully hereinbelow, in the course of the continuing test our system checks Bler, Burst, C2un, symmetry, I11 radial tracking, E21, E31, E12, E22, HF low and HF dropouts.

After the eccentricity test is complete, the system returns to normal operation. Basically three things are happening simultaneously, as described under (a), (b) and (c) below.

a) We tap off the error flags directly from the player at 74, 76, 78 and 80 as C1F1, C1F2, C2F1 and C2F2 which are flags from the player decoders C1 and C2, which flags define the error conditions for every block of data as it is clocked through the decoder. The first decoder C1 is designed to correct random errors. C2 is able to correct random errors which C1 was unable to correct. The C1 decoder corrects minor errors and flags uncorrectable errors. The C2 decoder corrects larger errors aided by the error flags. Uncorrected errors from C2 (C2un) are also flagged.

As is known in the art, signals derived from the four flags indicate the number of errors in a frame. For example, from C1 with C1F1 high and C1F2 low, a signal E11 indicates that one error has been corrected in C1. With C1F1 low and C1F2 high, a signal E21 indicates that two errors have been corrected in C1 and with both C1F1 and C1F2 high, signal E31 indicates that there are more than two errors in C1 and the data is passed to C2. The three signals, E11, E21, and E31 are added to provide a block error rate Bler signal indicating the number of errors in a block. At the decoder C2, a signal E22 signals two defect symbols in a frame. The E21 and E22 signals are combined to form a Burst error count. Another signal, C2un indicates the errors which leave C2 uncorrected. In our system, the errors which occur during each second, are accumulated and placed in the dual port memory of FIGS. 8A and 8B. It will be remembered that at the same time the system is reading the serial data RS422 on lines 88, 90, 92 and 94, indicating the time of occurrence of the errors.

As shown in FIG. 7, microcontroller board 40 takes the error information C1F1, C1F2, C2F1 and C2F2 on lines 74, 76, 78 and 80 from the error decoders of the player 46. Counters on the microcontroller board decode and count the number of C1F2 (E21), E31, Burst, Bler, C2F1 (E12), C2F2 (E22), C2un, HF low, and HF dropouts that occur in a second. After the counts are placed in the dual port memory 38 each second the counters in the controllers are reset to zero. The microcontroller board 40 also reads serial RS422 information from the compact disc player 46 every frame. The serial data contains the track, index, track time and absolute time of the compact disc.

b) The player includes a servo system which generates a radial analog signal which causes the laser spot to follow the disc track. As indicated by block 370 of FIG. 10, we monitor the radial analog signal at terminals 134 and 136 of FIG. 3. As is pointed out hereinabove, the radial tracking signal at terminals 134 and 136 of FIG. 3 is applied to conductors 226 and 228 of FIG. 6 to produce peak-to-peak and RMS signals on conductors 238 and 250. The filtering steps which result in the peak-to-peak and RMS signals are indicated by blocks 372 and 374 of FIG. 10. This effectively separates the signal into two parts, one of which contains all of the information from a point up and the other of which contains all of the information from a point down. These are applied to two different terminals of the microcontroller 252. As indicated by blocks 376 and 378 of FIG. 10, the two inputs are digitized internally of the controller 252. We then divide the peak-to-peak signal by the RMS signal and multiply the result by a constant to get the running radial noise error at block 380. For example, running radial noise error=0.51 (P—P/RMS).

Figure 11:
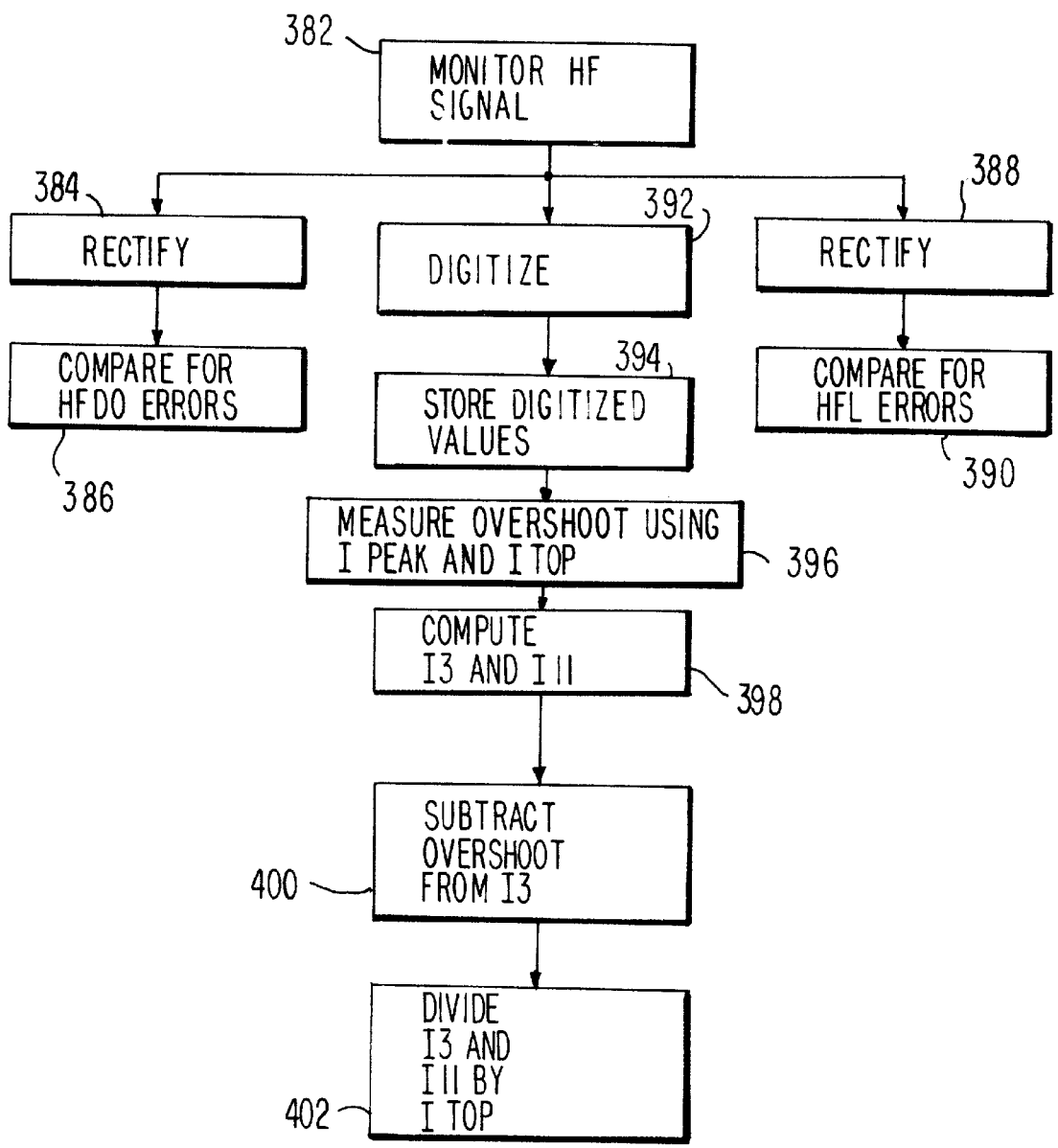
FIG. 11 is a diagrammatic view illustrating the steps performed in the course of generating high frequency error signals.

The radial tracking board 44 processes the radial tracking signal in order to calculate the eccentricity and radial tracking value. The eccentricity value is determined at the beginning of a test only, while radial tracking is calculated throughout the test. This information is sent to the HF board 42, once per second, which passes it to the supervisory microcontroller board 40.

c) The player optical pickup or photodiode and its processing circuits produce a signal resembling a high frequency sine wave called the EFM signal and sometimes referred to as the RF or HF signal. We monitor this signal at terminals 110 and 112 to obtain HF low and HF dropout, as indicated in FIG. 4 at 178 and 172. Referring to FIG. 11, after monitoring the signal as indicated at block 382, it is rectified as indicated at blocks 384 and 388 and the rectified signals are compared with references at 386 and 390 to provide error signals HFDO and HFL.

We have noticed that owing to the player electronics there is actually an overshoot in the HF waveform. Since I3 does not go into saturation, there is no way of seeing the overshoot. We detect the overshoot on the I11 pulse and substract it from the I3 pulse so that we have an accurate measure of I3.

More specifically, referring again to FIG. 11, the HF signal is digitized (as represented by the block 392) and stored in the microprocessor memory (as represented by the block 394). The microprocessor memory is then scanned, looking at every point and the delta, or difference, between points. Clearly, when the curve is flat the delta should be small and during the slope the delta should be large. In measuring the overshoot, we first take the peak, or maximum signal (I PEAK). We then wait for the deltas to get very small. When that occurs we average over a number of points and say that is the true top (I TOP). This true top (I TOP) is subtracted from I PEAK to get the overshoot. These operations are represented by the block 396.

After the I3 and I11 signals are computed (as represented by the block 398), the overshoot is subtracted from I3 (as represented by the block 400). We then divide both I3 and I11 by I TOP (as represented by the block 402). The result is the I3 modulation value (I3 MOD AMP) and the I11 modulation value (I11 MOD AMP). The I3 and I11 modulation values are the values that are checked and stored.

In the explanation of the operation of our system given hereinbelow, it will be understood that the main computer 36 communicates with one side of the dual port memory 38 and that the microcontroller units including units 40, 42 and 44 communicate with the other side of the dual port memory 38. Data is collected by the microcontrollers and put into the dual port memory. The main computer 36 then reads the collected data out of the dual port memory and performs the operations for which the computer 36 has been programmed such as comparison of the data with threshold values and the like. All of the necessary calculations take place in the main computer 36. The dual port memory acts like a gateway. It is there as a buffer to hold the information collected by the microcontrollers until the computer has time to access it.

Referring now to FIG. 12, which summarizes the overall operation of our system from a start at 404, at 406 we first load the threshold limits into the main computer 36. The threshold limits loaded are those for Bler, Burst, C2un, symmetry high, symmetry low, I11, I3 high, I3 low, radial tracking, E21, E31, E12, E22, HF low and HF dropouts. Next at 408 we perform the eccentricity test as described hereinbelow. If the test is failed as at 410, we stop the test at 412.

If the CD passes the eccentricity test, next, as indicated at 404, we continue by collecting the data representing all the parameters of our test. As is indicated by block 424, the data is collected by the microcontroller units including but not limited to units 40, 42 and 44 for a period of one second after which the microprocessor counters are reset at 428 and the data is passed to the dual port memory 38.

As indicated by block 416, the main computer 36 compares the data from the dual port memory 38 with the threshold values previously set into the main computer to detect errors at 418. As indicated by blocks 420 and 422, the main computer stores each maximum or minimum one second value for each parameter being checked as well as the absolute time, track minute and track second. For Bler the computer calculates a ten second running average for the graph. The comparison with the threshold value is the one second reading. Each time the comparison of the parameter in question with the corresponding threshold indicates an error the computer signals the operator and the test continues.

We program the computer 36 to provide the operator with a number of menus for display of the collected data. The SELECT TEST menu permits the operator to select which six plot screen to display—Red Book or Indicative, to do a full test, partial test, continue a test, zoom in on a plot screen, or to exit the test on the compact disc.

The six plot Red Book screen consists of Bler, Burst, C2un, Symmetry, I11 & I3 MOD AMP and radial tracking. Bler, Burst, and C2un are plotted on a logarithmic scale for the error counters (0.5 to 999) versus the absolute time of the compact disc. I11 and I3 MOD AMP are plotted from 0 to 1 versus the absolute time of the compact disc. Radial tracking is plotted from 0 to 50 nanometers versus the absolute time of the compact disc. After the initial 40 seconds, the data is displayed on the plots every 20 seconds. The information is not plotted for 40 seconds in order to collect enough data to do a running ten second average for Bler. If any error values exceeds the threshold limits, a bell will ring. The plotted data is always twenty seconds behind collected data because of averaging.

The window 26 allows the operator to select tests. Time information is displayed as track, index, track time, absolute time, and remaining time. Maximum or minium one second errors are displayed as follows: Bler, Burst, C2un, SymHi, SymLo, I11, I3Hi, I3Lo, radial tracking and Burst Magnitude along with the track time which they occurred. The disc identification information is displayed for the operator in order to determine which compact disc is being tested.

The six plot Indicative screen consists of E21, E31, E12, E22, HFlow and HF dropouts. E21, E31, E12, E22, HF low and HF dropouts are plotted on a logarithmic scale for the error counters (0.5 to 999) versus the abolute time of the compact disc. After the initial 40 seconds, the data is displayed on the plots every 20 seconds. The information is not plotted for 40 seconds in order to collect enough data to do a running ten second average for Bler. If any error value exceeds the threshold limits, a bell will ring. The plotted data is always twenty seconds behind collected data because of averaging.

Time information is displayed at 26. Maximum one second errors are displayed as follows: E21, E31, E12, E22, HF low, HF dropouts, and eccentricity along with the track time which they occurred. The disc identification information is displayed for the operator in order to determine which compact disc is being tested.

The Full Test pick does a test on a compact disc from the beginning to the end. The cursor is placed on the screen when reaching the end of the music on the compact disc. The time information from the track, index, track time, absolute time, and time remaining are displayed in the window 26 every second as the test runs. The maximum one second error of either the Red Book or Indicative errors are displayed in the window 26 at the beginning of a test. The Red Book or Indicative six plot screens are updated every twenty seconds except for the first plot which takes forty seconds. Twenty seconds is used because this is the smallest amount of time which corresponds to one pixel and can be plotted in the six plot windows. The first plot takes forty seconds in order to get enough data to do a ten second running average for Bler.

It is believed that the other picks on the SELECT TEST menu will be clear without a detailed explanation.

The SCREENS menu allows the operator to select the picks of Bler, Burst, C2un, Sym(metry), I11 & I3, radial tracking, E21, E31, E12, E22, HFlow, HFDO, or Stats plots.

The Bler Plot pick plots the ten second running average Bler error count versus the abolute time on the monitor. The running ten second average Bler is calculated every second from the previous ten second readings. The largest of the ten calculated ten second readings is displayed on the plot. If the running average Bler is greater than 999, it is plotted as 999. However, the original data is kept for other calculations.

For each of the Burst, C2un, E21, E31, E12, E22, HF low and HFDO Plots plots the highest value to occur in a ten second interval versus the absolute time on the monitor. The parameter is read every second. The largest of the ten second readings is displayed on the plot. If the value is greater than 999, it is plotted as 999 and the original data is kept for other calculations.

The Sym(metry) Plot pick plots the highest or lowest Sym to occur in a ten second interval versus the absolute time on the monitor. If Sym is greater than 50% or less than −50%, it is plotted 50% or −50% respectively. However, the original data is kept for other calculations.

The I11 & I3 Plot pick plots the lowest I11 and highest or lowest I3 to occur in a ten second interval versus the absolute time on the monitor. If I11 or I3 is greater than 1 they are plotted as 1. However, the original data is kept for other calculations.

The Rad Plot pick plots the highest radial tracking value to occur in a ten second interval versus the absolute time on the monitor. If radial tracking value is greater than 50 nanometers, it is plotted as 50 nanometers. However, the original data is kept for other calculations.

The Stats pick displays statistical information of the data collected by the CD analyzer on the monitor. Eccentricity is displayed in microns on the top line. The Faults Per Sec. is the type of errors that occurred on the compact disc, which are Bler, Burst, C2un, Sym(metry) high, Sym(metry)low, I11, I3 high, I3 low, Rad(ial) tracking, E21, E31, E12, E22, HFlow, HFDO, and BurstMag. The mean is the average error throughout the entire compact disc which is total error count divided by the total number of seconds played. StdDev is the standard deviation of the errors throughout the entire compact disc. The Max is the maximum one second error which occurred on the compact disc. ATime is the absolute time on the compact disc where the maximum one second error occurred. Tr and TTime is the track and track time where the maximum one second error occurred. The absolute time gives the operator a time so a zoom plot can be displayed to look at the error. The track and track time allows the operator to find the location of the error on the compact disc, so they can replay the compact disc to verify the error.

Further on command by the computer 36, the information can be printed out on printer 34 rather than being displayed at 26.

It will be seen that we have accomplished the objects of our invention. We have provided a compact disc analyzer system which overcomes the defects of testers of the prior art. Our system is reliable. The result produced by our system is repeatable. Our system records both errors and the time of occurrence of the errors.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of measuring overshoot in a high frequency (HF) signal generated by a compact disc player during testing of a compact disc, comprising the steps of:
    determining a maximum signal value (I PEAK) of said high frequency (HF) signal;
    determining a true top value (I TOP) of said high frequency (HF) signal; and
    obtaining said overshoot of said high frequency (HF) signal using said maximum signal value (I PEAK) and said true top value (I TOP).

2. The method of claim 1 further comprising the step of digitizing said high frequency (HF) signal to obtain a digitized high frequency (HF) signal, and wherein:
    said step of determining a maximum signal value (I PEAK) comprises using said digitized high frequency (HF) signal to determine said maximum signal value (I PEAK); and
    said step of determining a true top value (I TOP) comprises using said digitized high frequency (HF) signal to determine said true top value (I TOP).

3. The method of claim 2, wherein said step of determining a true top value (I TOP) comprises the steps of:
    determining when differences between values of said digitized high frequency (HF) signal are indicative of a flat portion of said high frequency (HF) signal; and
    averaging values of said flat portion of said digitized high frequency (HF) signal to obtain said true top value (I TOP).

4. The method of claim 1, wherein said step of obtaining said overshoot of said high frequency (HF) signal comprises subtracting said true top value (I TOP) from said maximum signal value (I PEAK) to obtain said overshoot.

5. The method of claim 1 further comprising the steps of:
    determining an I3 value of said high frequency (HF) signal corresponding to minimum pit length of said compact disc under test; and
    correcting said I3 value using said overshoot to obtain a corrected I3 value.

6. The method of claim 5, wherein said step of correcting said I3 value comprises subtracting said overshoot from said I3 value to obtain said corrected I3 value.

7. The method of claim 6 further comprising the step of determining an I3 modulation amplitude using said corrected I3 value and said true top value (I TOP).

8. The method of claim 7, wherein said step of determining an I3 modulation amplitude comprises dividing said corrected I3 value by said true top value (I TOP) to obtain said I3 modulation amplitude.

9. A system for measuring overshoot in a high frequency (HF) signal generated by a compact disc player during testing of a compact disc, comprising:
    means for determining a maximum signal value (I PEAK) of said high frequency (HF) signal;
    means for determining a true top value (I TOP) of said high frequency (HF) signal; and
    means for obtaining said overshoot of said high frequency (HF) signal using said maximum signal value (I PEAK) and said true top value (I TOP).

10. The system of claim 9 further comprising means for digitizing said high frequency (HF) signal to obtain a digitized high frequency (HF) signal, and wherein:

said means for determining a maximum signal value (I PEAK) uses said digitized high frequency (HF) signal to determine said maximum signal value (I PEAK); and said means for determining a true top value (I TOP) uses said digitized high frequency (HF) signal to determine said true top value (I TOP).

11. The system of claim 10, wherein said means for determining a true top value (I TOP):

determines when differences between values of said digitized high frequency (HF) signal are indicative of a flat portion of said high frequency (HF) signal; and averages values of said flat portion of said digitized high frequency (HF) signal to obtain said true top value (I TOP).

12. The system of claim 9, wherein said means for obtaining said overshoot of said high frequency (HF) signal subtracts said true top value (I TOP) from said maximum signal value (I PEAK) to obtain said overshoot.

13. The system of claim 9 further comprising:

means for determining an I3 value of said high frequency (HF) signal corresponding to minimum pit length of said compact disc under test; and means for correcting said I3 value using said overshoot to obtain a corrected I3 value.

14. The system of claim 13, wherein said means for correcting said I3 value subtracts said overshoot from said I3 value to obtain said corrected I3 value.

15. The system of claim 14 further comprising means for determining an I3 modulation amplitude using said corrected I3 value and said true top value (I TOP).

16. The system of claim 15, wherein said means for determining an I3 modulation amplitude divides said corrected I3 value by said true top value (I TOP) to obtain said I3 modulation amplitude.

* * * * *